United States Patent [19]

Wharton

[11] 4,305,031
[45] Dec. 8, 1981

[54] ROTARY ELECTRICAL MACHINE

[75] Inventor: Eddie Wharton, Beaconsfield, England

[73] Assignee: Lucas Industries Limited, Birmingham, England

[21] Appl. No.: 149,338

[22] Filed: May 13, 1980

[30] Foreign Application Priority Data

May 15, 1979 [GB] United Kingdom ............... 16736/79

[51] Int. Cl.³ ...................... H02P 9/40; H02K 16/00; H02K 21/12
[52] U.S. Cl. ..................... 322/29; 310/114; 310/156; 322/51; 322/90
[58] Field of Search ............... 310/101, 112, 114, 116, 310/119, 156; 322/48, 51, 52, 29, 90

[56] References Cited

U.S. PATENT DOCUMENTS

| 2,741,712 | 4/1956 | Lonnqvist | 310/112 X |
| 3,151,261 | 9/1964 | Lee | 310/112 X |
| 3,214,675 | 10/1965 | Foster | 322/52 X |
| 3,280,400 | 10/1966 | Roe | 310/112 X |
| 3,713,015 | 1/1973 | Frister | 322/51 X |

Primary Examiner—Robert J. Hickey
Attorney, Agent, or Firm—Trexler, Bushnell & Wolters, Ltd.

[57] ABSTRACT

A rotary, permanent magnet, electrical generator has a stator in which a voltage is induced by a rotor having permanent magnet pole pieces arranged in two rows. An actuator can cause relative rotation of the rows of pole pieces to maintain a substantially constant output voltage from the stator. The actuator is responsive to a servo pressure signal from a valve which is, in turn, responsive to rotor speed. The stator may include a saturating winding for maintaining the output voltage substantially constant under varying external loads.

7 Claims, 4 Drawing Figures

U.S. Patent
Dec. 8, 1981
4,305,031
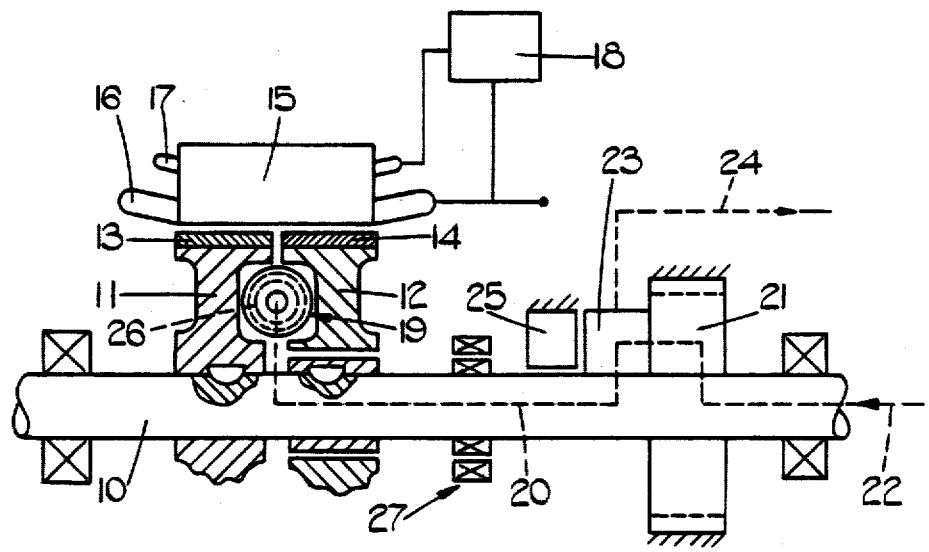
FIG.1.
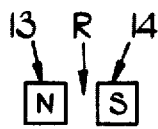
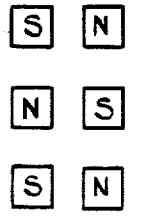
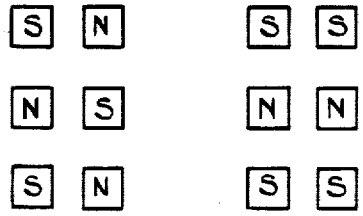
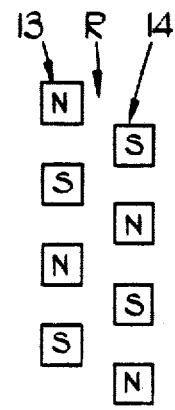
FIG.2.   FIG.3.   FIG.4.

ROTARY ELECTRICAL MACHINE

This invention relates to rotary electrical machines.

It is known to provide rotary electrical machines having permanent magnet rotors. In a generator the use of such rotors gives rise to difficulties in regulating output voltage under varying conditions of external load and shaft speed. In a motor there are corresponding difficulties in regulating the output speed.

It has been proposed to provide regulation as aforesaid by modification of the field of the permanent magnet, this modification being effected by relative movement between the permanent magnets. It is necessary that such relative movement be carried out with the electrical machine in operation. Additionally, the forces required to effect such movement may be considerable.

It is an object of the present invention to provide a rotary electrical permanent magnetic machine having servo control of the relative positions of the permanent magnets.

According to the invention a rotary electrical permanent magnet machine comprises a rotor having a plurality of first circumferentially spaced permanent magnet pole pieces and a plurality of second circumferentially spaced permanent magnet pole pieces, a first stator winding surrounding said rotor, means for providing a servo pressure signal which is dependent on the speed of said rotor, and an actuator responsive to said servo pressure signal for causing relative movement between said first and second pole pieces.

An embodiment of the invention will now be described by way of example only and with reference to the accompanying drawings in which:

FIG. 1 is a diagrammatic section through a permanent magnet electrical alternator, and FIGS. 2, 3 and 4 show developed views of the relative position of the permanent magnets in the alternator of FIG. 1, in respective operating conditions of the alternator.

A heteropolar permanent magnet generator has a rotor which includes a shaft 10 on which are mounted two toroidal yokes 11, 12. The yoke 11 is keyed to the shaft 10 for rotation therewith, and the yoke 12 is mounted for limited angular rotation relative to the shaft 10. A first plurality of samarium cobalt permanent magnet elements 13 are circumferentially spaced around the yoke 11, and a second plurality of samarium cobalt permanent magnet elements 14 are circumferentially spaced around the yoke 12.

A stator core 15 surrounds the elements 13, 14 and carries a first armature winding 16 from which an output voltage of the generator is derived. The core 15 also carries a second, saturating winding 17 which is energisable by a control circuit 18 which is responsive to the output voltage from the winding 16. The arrangement is such that the winding 16 is responsive to flux from the winding 17 which is energised in a sense to oppose changes in the output voltage of the coil 16 due to variations in an external load.

Relative rotation between the yokes 11, 12 and hence of the magnets 13, 14 is effected by a piston and cylinder unit 19 which rotates with the yoke 11, and whose relatively movable parts are respectively connected to the yoke 11 and the yoke 12. The unit 19 is operated by a servo pressure supplied through a passage 20 within the shaft 10.

The pressure in passage 20 is provided by a positive-displacement pump 21 whose rotating portions are drivingly connected to the shaft 10 and which draws liquid from a low pressure inlet 22 and delivers it under pressure to a regulating valve 23. The regulating valve 23 is responsive to the speed of the shaft 10 and controls the pressure in the passage 20 so that this pressure is a function of the speed of the shaft 10. Excess pressure is conveniently vented from the valve 23 to a low pressure return line 24. An electro-magnetic device 25 is energisable at a predetermined level of the speed of the shaft 10. Conveniently the device 25 is energised by an auxilliary generator 27 which forms part of the machine as a whole. The device co-operates with the valve 23 to render the latter operative at this predetermined speed, in such a manner that below the aforesaid predetermined speed the pressure in passage 20 is insufficient to cause relative movement of the yokes 11, 12. A biasing spring, indicated at 26 may be engaged between the piston and cylinder portions of the unit 19, to assist the flux of the magnets 13, 14 in biassing the yokes 11, 12 against relative rotation in response to an increase in pressure in the passage 20.

In use, with the shaft 10 at rest, the relative positions of the magnets 13, 14 are as shown in FIG. 2, in which positions the flux from the magnets is effectively short-circuited and does not coact with the winding 16. These relative positions continue to exist until the speed of the shaft has reached a first level, there being no output from the generator until this first speed level has been reached. The device 25 acts at the aforesaid first speed level to render the valve 23 operative, at which stage the valve 23 passes substantially the whole of the pressure generated by the pump 21 to the piston and cylinder unit 19, and it is arranged that this pressure is sufficient to cause the yoke 12 to move hard over with respect to the yoke 11, into the relative magnet positions shown in FIG. 3. These magnet positions correspond to maximum flux, and the generator output becomes the maximum consistent with the aforesaid first speed level.

It will be apparent that since the generator has moved from zero output to a maximum output, the power needed to effect relative movement of the magnets 14 is substantially equal to the change in generator output power, and the pump 21 is arranged to provide a sufficient output for this purpose.

A subsequent increase in shaft speed causes the pressure in passage 20 to decrease and to permit relative rotation between the yokes 10 and 11, moving the permanent magnets 13, 14 out of the polar alignment shown in FIG. 3 towards the relative positions shown in FIG. 4. This movement results in a weakening of the combined fields of the magnets 13, 14 reducing the output voltage from the winding 16. If the speed of the shaft 10 exceeds a predetermined maximum the pressure in passage 20 falls to a level at which the spring 26 acts on the yokes 11, 12 so that the magnets 13, 14 regain the relative positions shown in FIG. 2, that is the magnets 14 are displaced by one pitch from the original positions shown in FIG. 3, and the flux from the magnets 13, 14 is effectively shorted out, and substantially no output voltage is provided from the windings 16.

Rotation of the shaft 10 is such as to produce movement of the magnets 13, 14 in the direction shown by the arrows R in FIGS. 2 to 4. Thus, if the shaft 10 accelerates rapidly, inertia of the yoke 12 will cause this yoke, and the magnets 14 to move, relative to the magnets 13, towards the positions shown in FIG. 3, temporarily reducing the output voltage of the generator, until the correct relative positions are set through the agency of the valve 23. Similarly, a rapid deceleration of the shaft will cause a temporary increase in output voltage. Acceleration and deceleration of the shaft 10 will thus result in an initial relative movement of the magnets 14 in the correct direction to regulate the output voltage.

It is to be understood that, though the described example relates to a heteropolar machine with a radial air gap, the invention may also be applied to homopolar machines and those having axial air gaps.

With the magnets in the relative positions shown in FIG. 3 the flux from the magnetic elements 13, 14 is a maximum and is arranged to provide the required output voltage at the maximum external load for which the machine is designed.

It will be apparent that the arrangement described may be operated as a motor if the main stator windings are supplied with alternating current which is synchronised in accordance both with the rotor speed and the number of permanent magnet poles.

The arrangement described thus provides a machine in which the voltage on the main stator winding may be maintained substantially constant under conditions of varying external load and varying rotor speed. For example, in the case of a generator which is driven by a prime mover whose speed may vary, and which supplies a variable external load, a decrease in rotor speed may be accompanied by a decrease in external load. In such circumstances it is disadvantageous that a single flux-modifying device be made responsive to both variables, since the variables will require modification of the flux in opposite senses. The present invention provides that the flux can be modified in response to the variables independently.

I claim:

1. A rotary, permanent magnet, electrical machine, comprising a rotor having a plurality of first circumferentially spaced permanent magnet pole pieces and a plurality of second circumferentially spaced permanent magnet pole pieces, a first stator winding surrounding said rotor, means for providing a servo pressure signal which is dependent on the speed of said rotor, and an actuator responsive to said servo pressure signal for causing relative movement between said first and second pole pieces.

2. A machine as claimed in claim 1 which includes means, responsive to rotation of said rotor below a first speed level, for causing said first and second pole pieces to be urged to first relative positions in which their flux does not coact with said first stator winding.

3. A machine as claimed in claim 2 in which said means for providing the servo pressure signal comprises a valve responsive to said rotor speed for regulating said servo pressure signal.

4. A machine as claimed in claim 3 in which said means for causing said pole pieces to be urged to said first relative position includes a device coacting with said valve for causing said valve to maintain said servo pressure signal at a predetermined level when said rotor speed is below said first level.

5. A machine as claimed in claim 3 or claim 4 which includes a pump drivingly connected to said rotor for supplying fluid under pressure to said valve.

6. A machine as claimed in claim 1 in which said rotor comprises first and second yokes on which said first and second pole pieces are respectively mounted, said second yoke being angularly movable about the rotor axis relative to said first yoke, and said actuator comprises a piston and cylinder respectively coacting with said first and second yokes.

7. A machine as claimed in claim 1 which includes a second stator winding, said first winding being responsive to a flux which can be generated by said second winding, and a control circuit, responsive to the voltage induced in the first winding, for energising said second winding in a sense to oppose changes in said induced voltage.

* * * * *